United States Patent [19]

Streicher

[11] Patent Number: 4,884,757
[45] Date of Patent: Dec. 5, 1989

[54] FEEDER FOR A FIELD CROP CHOPPER

[76] Inventor: Josef Streicher, Blumenstrasse 5, D-9029 Sauerlach-Lochhofen, Fed. Rep. of Germany

[21] Appl. No.: 262,085

[22] Filed: Oct. 24, 1988

Related U.S. Application Data

[63] Continuation of Ser. No. 36,071, Apr. 9, 1987, abandoned.

[30] Foreign Application Priority Data

Apr. 15, 1986 [DE] Fed. Rep. of Germany ....... 3612660

[51] Int. Cl.$^4$ .............................................. B02C 18/22
[52] U.S. Cl. .................................... 241/222; 241/101.7
[58] Field of Search ................................. 241/222–225, 241/246, 247, 260.1, 101.7; 56/14.5

[56] References Cited

U.S. PATENT DOCUMENTS

| 3,126,931 | 3/1964 | Blanshine et al. | 241/222 X |
| 3,341,137 | 9/1967 | Rettenmaier | 241/222 |
| 3,552,463 | 1/1971 | Witt | 241/222 |
| 3,853,276 | 12/1974 | Fisher | 241/247 |

Primary Examiner—Mark Rosenbaum
Attorney, Agent, or Firm—Collard, Roe & Galgano

[57] ABSTRACT

A feeder for a field crop chopper is provided which has a stationary mating knife, at least one chopping knife arranged at a cutting angle to the mating knife so as to provide a drawing cut commencing at a given part of the mating knife, and a draw-in device whose feed direction is generally perpendicular to the mating and cutting knives and which is supported directly in front of the mating knife generally parallel thereto. The draw-in device includes at least one draw-in roll which is provided with a transverse feed device which imparts a feed direction component to the material to be chopped which is axial with respect to the at least one draw-in roll and directed towards the part of the mating knife at which the cut of the material commences.

12 Claims, 2 Drawing Sheets

FEEDER FOR A FIELD CROP CHOPPER

REFERENCE TO RELATED APPLICATIONS

This is a continuation application of application Ser. No. 036,071, filed Apr. 9, 1987, for "A FEEDER FOR A FIELD CROP CHOPPER" now abandoned.

The invention relates to a feeder for a field crop chopper comprising a stationary mating knife and at least one chopper knife set at a cutting angle to the stationary mating knife for producing a drawing cut commencing at a given section of the said stationary mating knife, and draw-in means arranged directly on the upstream side of the stationary knife generally parallel to the same, said draw-in means consisting of at least one draw-in roll.

Such a feeder has been described in the German examined specification 3,441,265, in which the intention is to make possible a good drawing cut by lateral guiding of the material to be chopped on ribs arranged on a stripper and partly on the mating knife. Displacement of the material to be chopped, which still possesses a certain degree of elasticity, more especially at large angles of cut between the knives and/or when the knives are blunt with a consequent pile-up of material on the mating knife towards the end of the cut, is hard to prevent, because the cushion of material is not sufficiently weighty to come into effective engagement with the grooves between the ribs. The chopping up of the piled-up layer of material thus generally located at the end of a cut of the mating knife is caused by the chopper knife, which in any case has a smaller angle of cut, in an unsatisfactory manner impairing the quality of chopped material with an effect that is more in the nature of a pounding than a cutting action.

One object of the present invention is to avoid the shortcomings noted above and to devise a feeder of the above-noted type which effectively counters the lateral displacement of the material to be chopped and thus also any pile-up of the material in the lateral part of the cut end so prevents any chopping and consequent, usually uneven wear of the knives and the mating knives.

In accordance with the invention this object is attained inasfar as at least one draw-in roll has transverse feed means whose feed direction, running axially in relation to the draw-in roll, is towards the part of the mating knife at which the cut commences.

The design of the draw-in roll in keeping with the invention brings with it the advantage that the material to be chopped is fed both in a direction towards the chopper knives and also transversely in relation thereto so that the edge part of the transverse knife, at which the cut commences, is covered with a cushion of material and thus there is a distribution, more even than in the case of conventional draw-in rolls, of the material to be chopped over the width of the draw-in passage. Owing to the feed direction being opposite to the direction of the displacing effect due to the drawing cut, towards the cushion of material there is a reliable avoidance of displacement of the material to be chopped in connection with the powerful pre-pressing action of the spring-loaded draw-in roll, and also there is a reduction in pounding and wear. There is the advantage that even obliquely and transversely orientated parts of plants are engaged by the draw-in roll in accordance with the invention so that the feeding effect and the processing rate are enhanced.

In accordance with a preferred form of the invention in which the orbit of the draw-in roll is as near as possible to the orbit of the knife and with slender entraining teeth, whose height is approximately equal to the maximum thickness of the cushion of material, the entraining teeth bite into the cushion of material pressing on it and holding it fast during the cut so that even large, transverse, oblique and longitudinally aligned plant fragments such as the ears of corn cobs are no longer drawn uncut in an uncontrolled fashion into the chopper. To ensure that this is so, in the design of two superposed oppositely rotating draw-in rolls the diameter of the upper draw-in roll is made relatively small so that on the one hand such roll has sufficient space in the so-called nozzle of the chopper and on the other hand it forms with guide means leading to the mating knife, such as a floor plate, a well-developed feed trough so that the holding action during cutting and the transverse feed action are improved.

The invention and its manner of operation will now be described in what follows with reference to one working embodiment thereof in more detail.

Figure 1:
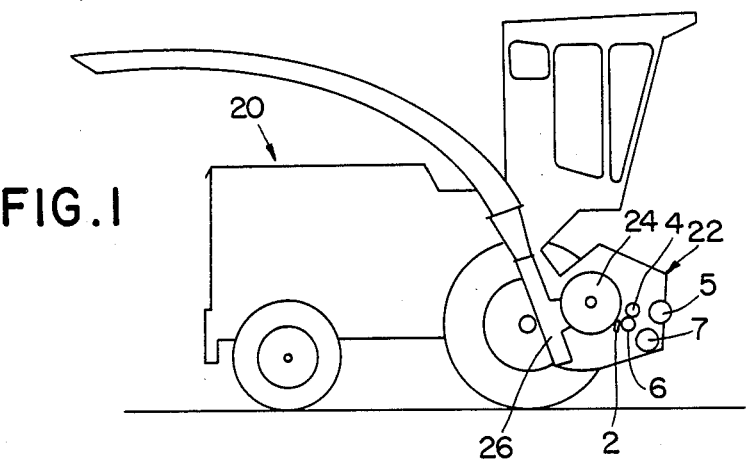
FIG. 1 is a diagrammatic representation of a chopper in the form of a field impelement.

A self-propelled chopper generally referenced 20 and in the form of a mobile field implement has a feed device 22 for the material to be chopped up. This device comprises two pairs of respectively oppositely rotating draw-in rolls 5, 7 and 4, 6 and it feeds the material to be chopped to the cutting zone in which the chopper knives knifes 1 on a rotary drum 24 cooperate with a stationary mating knife 2. The comminuted material is discharged by a feed blower 26 and a feed elbow 28.

Figure 2:
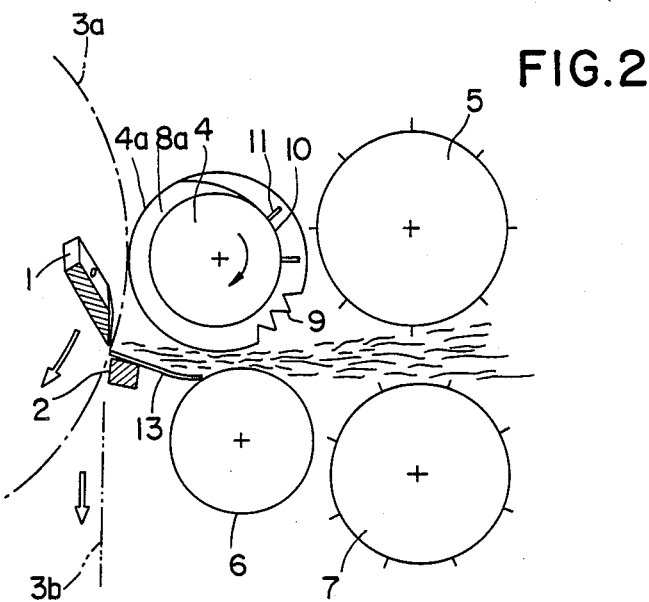
FIG. 2 shows the feed device of the chopper from the side with a draw-in roll provided with transverse feeding and entraining means.
Figure 3:
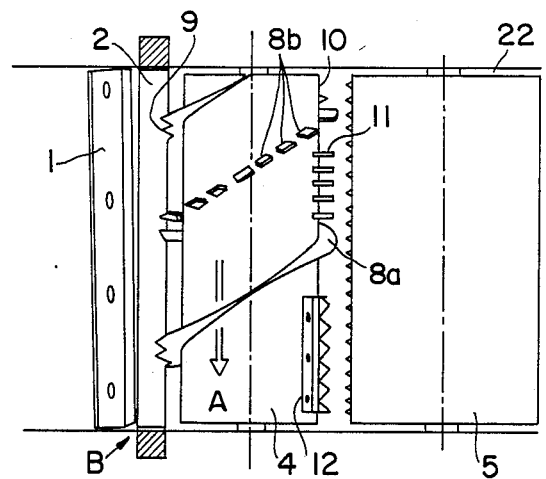
FIG. 3 is a plan view of the structure shown in FIG. 2 but with some modifications in the transverse feed and entraining means.

In the embodiment of the invention shown here, a drum chopper, the chopping knives 1 move along a cylindrical orbit 3a (FIG. 2). The invention is however also applicable to disk wheel choppers, in which the chopper knives are moved in an orbit which is also shown in FIG. 2 and is referenced 3b.

Figure 4:
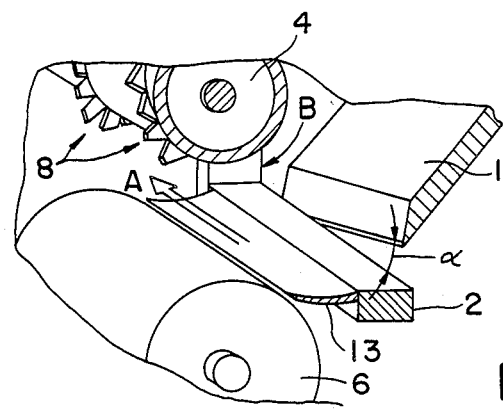
FIG. 4 is a perspective view of the knives.

The copper knives 1 are set at an angle $\alpha$ of cut to the mating knife as marked in FIG. 4 so that, as shown also in FIG. 4, the cut commences at the end B, shown at the rear in FIG. 4, of the mating knife 2 which in this case, as is conventional with disk wheel choppers, is in the form of a cutting frame with upwardly drawn ends and comes to an end at the front end of the mating knife 2. In front of the chopper there are draw-in means, as for instance four draw-in rolls 4, 5, 6 and 7, The draw-in means may also be replaced in part by conveyor belts, which are not shown. One of the draw-in rolls, preferably the upper draw-in roll 4 located directly in front of the knife orbit 3a or 3b, respectively, has transverse feed means 8 which move the material to be chopped in the axial direction of the feed roll, that is to say in the feed direction A (FIG. 4) towards the end B of the mating knife 2, past which the obliquely set rotating chopper knife 1 moves and thus commences the cut.

This transverse feed means 8 is preferably in the form of a helical feed passage 8a surrounding the draw-in roll 4 and which may be provided with entraining teeth 9 for ensuring longitudinal feed towards the knife zone of the chopper.

The design of the helical feed passage 8a will be dependent on the desired direction of feed, the desired degree of transverse feed and the thickness of the cushion of material to be chopped which is to be drawn in. By modifying the helix angle and/or the number of helical grooves of the helical feed passage serving as the transverse feed means the degree of transverse feed may be adapted to suit the respective chopper and the angle α of setting of the knife.

As a further means for longitudinally feeding the material to be chopped it is possible to have entraining means in the form of conventional rows of teeth 12 or entraining pins 11 on the outer face 10 of the draw-in roll 4 between the helical feed passage 8a so as to partly project beyond it.

The helical feed passage 8a may have its place taken by entraining lugs 8b arrayed helically on the outer face 10 of the draw-in roll 4 so that the feeding action of the lugs feed is both in a longitudinal and also in a transverse direction.

In order to increase the holding effect of the draw-in roll 4 during cutting the roll is placed as near as possible to the orbit 3a or 3b of the knives 1.

In order to increase the transverse feeding action of the upper feed roll 4 it is possible to have a floor plate 13, which is arranged between the mating knife 2 and the forwardly offset so-called smooth roll 6, in the form of a trough. In this preferred form of the invention the design is such that the draw-in roll 4 is movably supported as near as possible and directly adjacent to the knife orbit part in the nozzle of the chopper so that there is a retaining effect of the helical feed passages 8a countering any lateral displacement of the material.

The invention is of particular advantage in connection with disk wheel choppers, whose mating knife as a so-called side frame is designed with corners that are upwardly drawn at the ends, since the corner, at which the cut comes to an end, is subject to a particularly high wear rate. This locally restricted wear meant that so far mating knives of high quality steel could only be used for a limited part of their otherwise possible working life, whereas in the design of the invention there is a more or less even degree of wear, which facilitates regrinding and ensures a working life of the mating knife which is many times longer than in the prior art. Furthermore, the noise level produced by the chopper is reduced owing to the practically even chopping effect without any pounding action.

The invention may be applied to all chopper devices with an angle between the knife and the mating knife, that is to say both to disk wheel and also drum choppers and in the case of the latter to knives which are set like hering-bone gearing. In this case the cut commences at the center and moves outwardly. In consequence the draw-in roll has to feed from the two outer sides towards the point at which cutting commences, namely the center of the mating knife by having two oppositely inclined draw-in rolls feeding towards the center.

I claim:

1. In a feeder device for a chopper having a stationary mating knife, at least one chopping knife arranged at a cutting angle to the mating knife so as to provide a drawing cut commencing at a given part of the mating knife, and draw-in means whose feed direction is generally perpendicular to the mating and cutting knives, the draw-in means including at least one draw-in roll being supported directly in front of the mating knife and having a longitudinal axis of rotation extending generally parallel thereto, wherein the improvement comprises a feed means extending over the total length of the at least one draw-in roll along the length of the roll in the direction of said axis of rotation which imparts a feed direction component along said axis of rotation of the at least one draw-in roll and towards the given part of the mating knife at which the cut commences.

2. The feeder device as claimed in claim 1, wherein, the transverse feed means are formed by at least one helical feed passage extending around the draw-in roll.

3. The feeder device as claimed in claim 2, wherein the helical feed passage has entraining teeth at is peripheral edge.

4. The feeder device as claimed in claim 2, which further comprises entraining means arranged on the outer face of the draw-in roll between the helical feed passage.

5. The feed device as claimed in claim 4, wherein the entraining means are in the form of pins.

6. The feed device as claimed in claim 4, wherein the entraining means are in the form of rows of teeth.

7. The feed device as claimed in claim 3, wherein said draw-in roll having the helical feed passage is arranged as close as possible to the orbit of the chopper knife and the entraining teeth are slender and have a height adapted to the maximum thickness of the cushion of material to be chopped.

8. The feed device as claimed in claim 1, wherein the transverse feed means consist of entraining lugs which are helically arranged on the outer face of the at least one draw-in roll.

9. The feed device as claimed in claim 1, which further comprises a guide element in the form of a trough disposed between the draw-in roll and the mating knife.

10. The feed device as claimed in claim 9, wherein said guide element is a floor plate.

11. The feed device as claimed in claim 9, wherein said guide element is in the form of a draw-in belt.

12. The feeder device as claimed in claim 1, wherein the draw-in roll having the transverse feed means is also provided with means for longitudinal feed in its direction of rotation.

* * * * *